United States Patent
Bengtsson et al.

(10) Patent No.: US 10,951,272 B2
(45) Date of Patent: Mar. 16, 2021

(54) SYSTEMS, METHODS AND DEVICES FOR BEAM SELECTION IN A WIRELESS COMMUNICATION SYSTEM

(71) Applicant: SONY CORPORATION, Tokyo (JP)

(72) Inventors: Erik Bengtsson, Eslöv (SE); Olof Zander, Södra Sandby (SE); Zhinong Ying, Lund (SE); Thomas Bolin, Lund (SE); Basuki Priyanto, Lund (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/495,791

(22) PCT Filed: Mar. 24, 2017

(86) PCT No.: PCT/US2017/023974
§ 371 (c)(1),
(2) Date: Sep. 19, 2019

(87) PCT Pub. No.: WO2018/174895
PCT Pub. Date: Sep. 27, 2018

(65) Prior Publication Data
US 2020/0028544 A1  Jan. 23, 2020

(51) Int. Cl.
*H04B 7/0408* (2017.01)
*H04B 7/06* (2006.01)
*H04B 7/08* (2006.01)

(52) U.S. Cl.
CPC ......... *H04B 7/0408* (2013.01); *H04B 7/0695* (2013.01); *H04B 7/088* (2013.01)

(58) Field of Classification Search
CPC ..... H04B 7/0408; H04B 7/0695; H04B 7/088
See application file for complete search history.

(56) References Cited

U.S. PATENT DOCUMENTS

| | | | |
|---|---|---|---|
| 2004/0229650 A1* | 11/2004 | Fitton | H04B 7/0811 455/561 |
| 2011/0110453 A1* | 5/2011 | Prasad | H04B 7/088 375/285 |
| 2013/0059619 A1 | 3/2013 | Kim et al. | |
| 2016/0065284 A1 | 3/2016 | Yu et al. | |
| 2016/0248451 A1* | 8/2016 | Weissman | H04B 1/40 |
| 2017/0289932 A1* | 10/2017 | Islam | H04W 56/001 |

(Continued)

OTHER PUBLICATIONS

Invitation to Pay Additional Fees and, Where Applicable, Protest Fee, International Application No. PCT/US2017/023974, dated Nov. 30, 2017, 11 pp.

(Continued)

*Primary Examiner* — Nguyen T Vo
(74) *Attorney, Agent, or Firm* — Myers Bigel, P.A.

(57) ABSTRACT

A method for beam sweeping in a wireless communication system is described. Beam sweeping includes performing a reduced beam sweep corresponding to a reduced set of beams that are a subset of a full set of beams available for transmitting and/or receiving from an antenna module, without sweeping beams that are not members of the reduced set of beams. The method includes selecting a beam out of the reduced set of beams for transmitting and/or receiving from the antenna module based on the reduced beam sweep without sweeping beams that are not members of the reduced set of beams. Related devices are disclosed.

19 Claims, 12 Drawing Sheets

(56) References Cited

U.S. PATENT DOCUMENTS

2017/0374637 A1\* 12/2017 Akkarakaran ...... H04W 64/006
2018/0199258 A1\* 7/2018 Cezanne .............. H04B 7/0408

OTHER PUBLICATIONS

International Search Report and Written Opinion of the International Searching Authority, International Application No. PCT/US2017/023974, dated Nov. 30, 2017, 17 pp.

\* cited by examiner

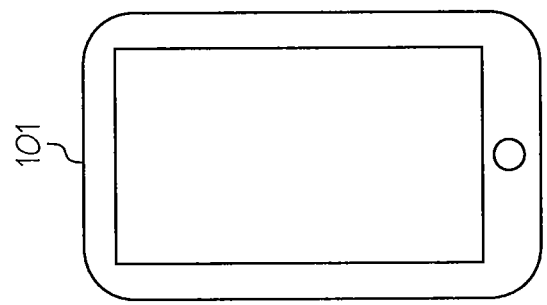
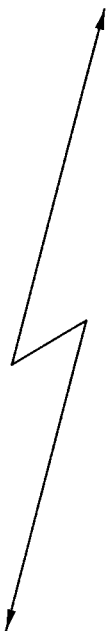
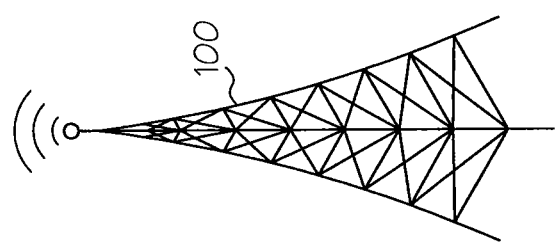
FIG. 1A

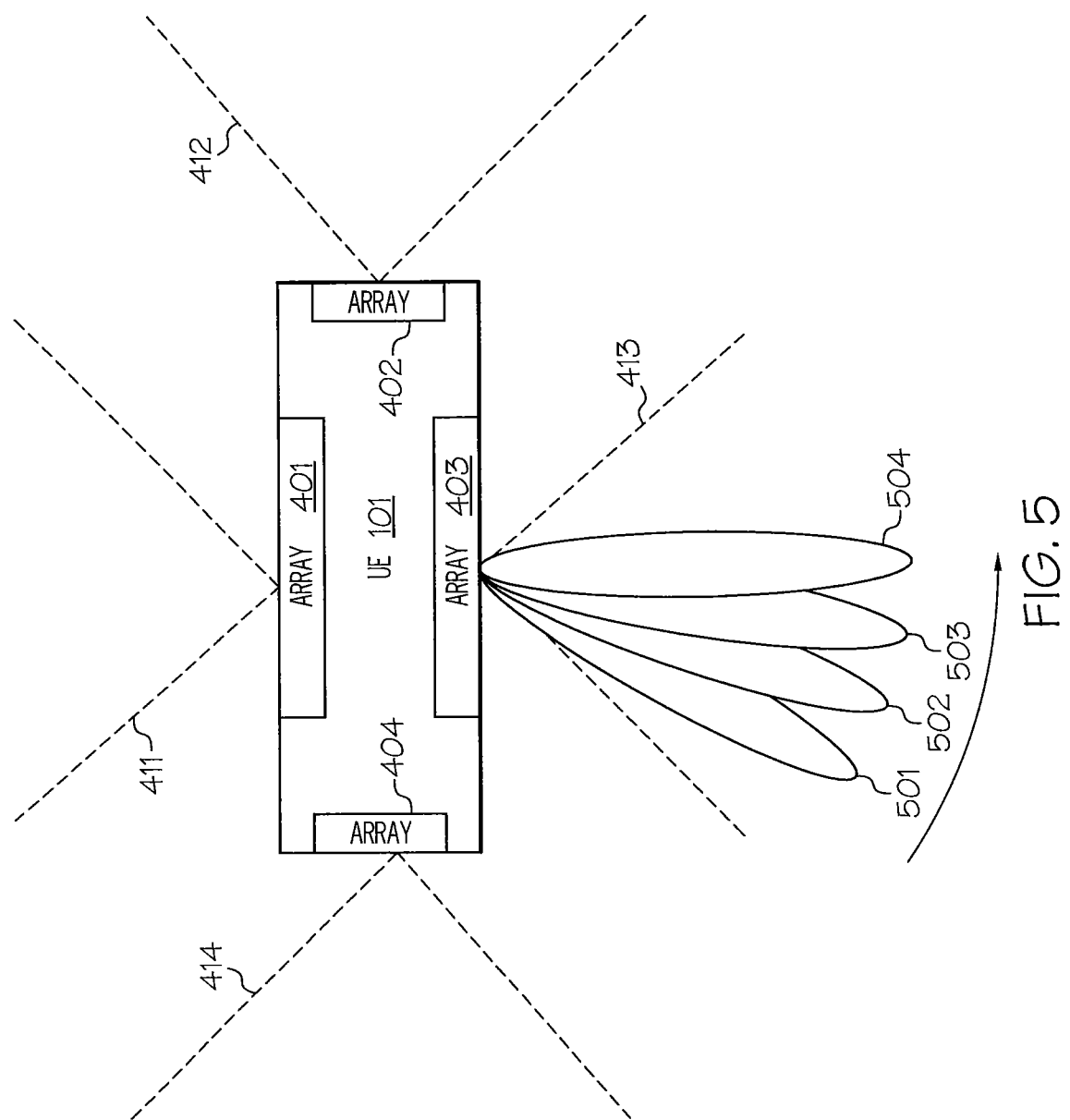

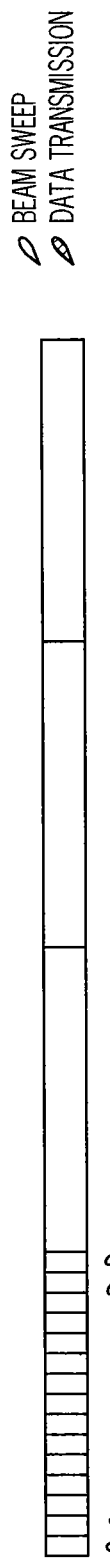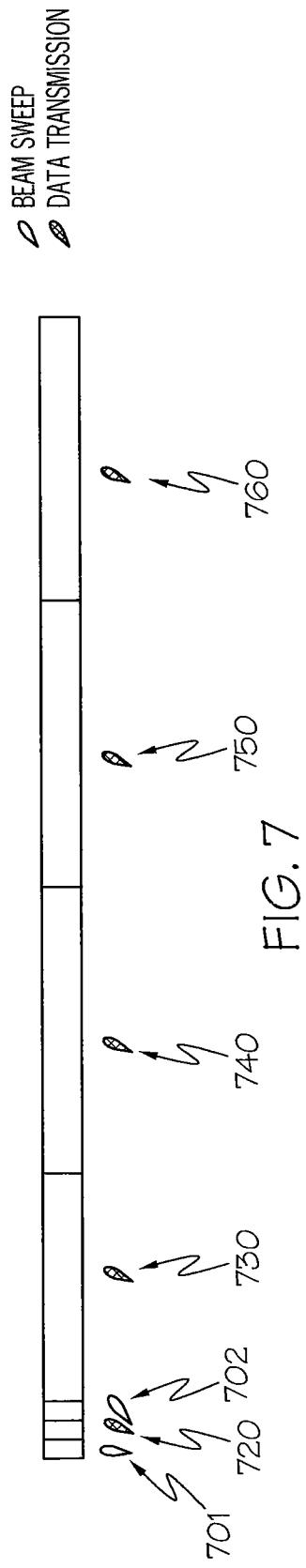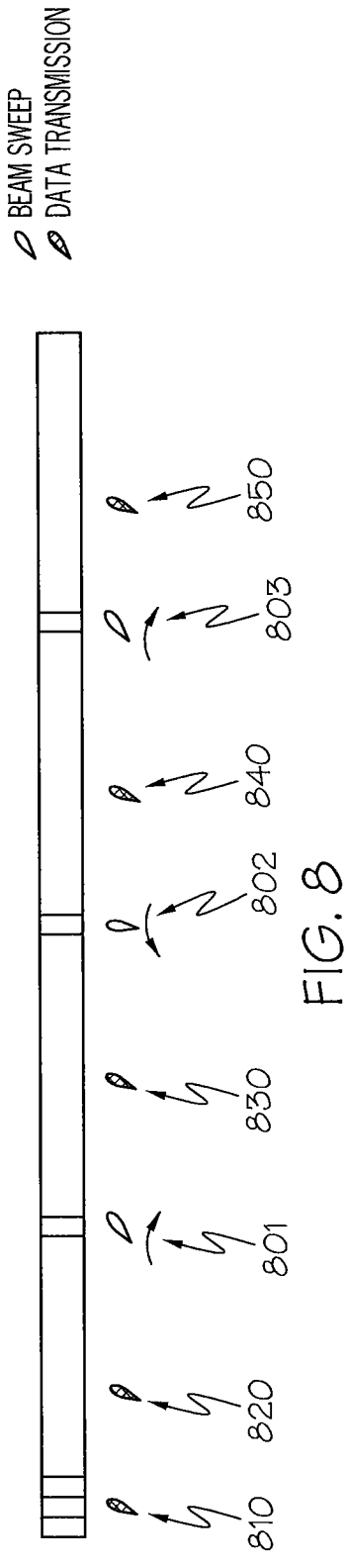

SYSTEMS, METHODS AND DEVICES FOR BEAM SELECTION IN A WIRELESS COMMUNICATION SYSTEM

CROSS REFERENCE TO RELATED APPLICATION

This application is a 35 U.S.C. § 371 national stage application of PCT International Application No. PCT/US2017/023974, filed on Mar. 24, 2017, the content of which is incorporated herein by reference in its entirety. The above-referenced PCT International Application was published in the English language as International Publication No. WO 2018/174895 A1 on Sep. 27, 2018.

FIELD

Various embodiments described herein relate to systems, methods and devices in a wireless communication system and more particularly to beam sweeping in a wireless communication system.

BACKGROUND

Wireless communication between two devices such as a network node and a mobile device involves data signals that are transmitted between the antennas of the mobile device and the node. Wireless communication systems may use multiple antenna elements to combine signals into one or more beams. Beams from one or more devices may need to be aligned with one another for proper communication. Various solutions for beam alignment include digital beam forming (DBF), analog beam forming (ABF), and/or hybrid beam forming (HBF). Multiple beams may be available for transmitting signals between the node and the mobile device.

SUMMARY

Various embodiments described herein provide a method of beam sweeping in a wireless communication system. The method includes performing a reduced beam sweep corresponding to a reduced set of beams that are a subset of a full set of beams available for transmitting and/or receiving from an antenna module, without sweeping beams that are not members of the reduced set of beams. The method includes selecting a beam out of the reduced set of beams for transmitting and/or receiving from the antenna module based on the reduced beam sweep without sweeping beams that are not members of the reduced set of beams.

In some embodiments, performing the reduced beam sweep includes scanning a reduced set of beam angles corresponding to the reduced set of beams. The full set of beams may correspond to a full set of beam angles available for transmitting and/or receiving by the antenna module.

The method may include performing a full beam sweep corresponding to the full set of beams at a first time interval. Performing the reduced beam sweep may occur at one or more second time intervals that occur more frequently than the first time interval. Performing the full beam sweep may be triggered by occurrence of a trigger event. The reduced beam sweep may be performed within a coherence time interval that occurs after a previous reduced beam sweep or a full beam sweep. The reduced beam sweep may be performed once per the coherence time interval.

In some embodiments, performing the reduced beam sweep corresponding to the reduced set of beams includes performing a sweep of two or more beams that neighbor an active beam currently used by the antenna module. Portions of the reduced beam sweep may distributed according to a pattern across a data transmission by interleaving the portions of the reduced beam sweep with portions of the data transmission.

In some embodiments, a first candidate beam of the reduced set of beams is evaluated to determine a first signal characteristic. A second candidate beam of the reduced set of beams may be evaluated to determine a second signal characteristic. Selecting the beam out of the reduced set of beams includes comparing the first signal characteristic of the first candidate beam with a second signal characteristic of the second candidate beam and selecting the first candidate beam or the second candidate beam for transmitting and/or receiving from the antenna module based on comparing the first signal characteristic with the second signal characteristic.

In some embodiments, a first beam may be selected for a first transmitting and/or a first receiving, and a first reduced beam sweep may be performed. The method may further include performing a second reduced beam sweep for a second transmitting and/or a second receiving that occur after the first transmitting and/or the first receiving. A second beam may be selected based on the second reduced beam sweep for the second transmitting and/or the second receiving. An angle difference may be determined between the first beam and the second beam. A third reduced beam sweep may be performed for a third transmitting and/or a third receiving from the antenna module. The third reduced beam sweep may include scanning beam angles based on the angle difference that was determined.

In some embodiments, performing the reduced beam sweep includes transmitting, by the antenna module, one or more of a reference signal, a sounding signal, a pilot signal, or a synchronization signal in at least one of the reduced set of beams. Beam information may be received based on one or more of the reference signal, the sounding signal, the pilot signal, or the synchronization signal that were transmitted. Selecting the beam out of the reduced set of beams may include selecting the beam based on the beam information that was received. The beam information may include information related to one or more signal characteristics associated with the one or more of the reference signal, the sounding signal, the pilot signal, or the synchronization signal that was transmitted. The beam information may include one or more of received signal strength, signal to noise ratio, or signal to interference ratio of the one or more of the reference signal, the sounding signal the pilot signal, or the synchronization signal that was transmitted by the antenna module.

In some embodiments, beam sweeping includes a first antenna beam sweeping that is performed by a first antenna module and selecting the beam includes selecting a first beam. The method may further include performing a second antenna beam sweeping by a second antenna module. The second antenna beam sweeping includes selecting a second beam by the second antenna module independently of the first antenna beam sweeping performed by the first antenna module.

Various embodiments described herein can provide a wireless electronic device used in a wireless communication system. The wireless electronic device includes an antenna module that is configured to perform operations including performing a reduced beam sweep corresponding to a reduced set of beams that are a subset of a full set of beams available for transmitting and/or receiving from the antenna module, without sweeping beams that are not members of the reduced set of beams. Operation performed by the antenna module include selecting a beam out of the reduced set of beams for transmitting and/or receiving from the antenna module based on the reduced beam sweep without sweeping beams that are not members of the reduced set of beams.

In some embodiments, performing the reduced beam sweep includes scanning a reduced set of beam angles corresponding to the reduced set of beams. The full set of beams may correspond to a full set of beam angles available for transmitting and/or receiving by the antenna module.

In some embodiments, the antenna module is further configured to perform operations including performing a full beam sweep corresponding to the full set of beams at a first time interval. Performing the reduced beam sweep may occur at one or more second time intervals that occur more frequently than the first time interval. Performing the reduced beam sweep corresponding to the reduced set of beams may include performing a sweep of two or more beams that neighbor an active beam currently used by the antenna module.

In some embodiments, a first candidate beam of the reduced set of beams is evaluated to determine a first signal characteristic and a second candidate beam of the reduced set of beams is evaluated to determine a second signal characteristic. Selecting the beam out of the reduced set of beams may include comparing the first signal characteristic of the first candidate beam with a second signal characteristic of the second candidate beam and selecting the first candidate beam or the second candidate beam for transmitting and/or receiving from the antenna module based on the comparing the first signal characteristic with the second signal characteristic.

In some embodiments, selecting the beam includes selecting a first beam for a first transmitting and/or a first receiving, and performing a first reduced beam sweep. The antenna module is further configured to perform operations including performing a second reduced beam sweep for a second transmitting and/or a second receiving that occur after the first transmitting and/or the first receiving. The antenna module may select a second beam based on the second reduced beam sweep for the second transmitting and/or the second receiving. The antenna module may determine an angle difference between the first beam and the second beam. The antenna module may perform a third reduced beam sweep for a third transmitting and/or a third receiving from the antenna module. The third reduced beam sweep includes scanning beam angles based on the angle difference that was determined.

In some embodiments, performing the reduced beam sweep includes transmitting, by the antenna module, one or more of a reference signal, a sounding signal, a pilot signal, or a synchronization signal in at least one of the reduced set of beams. Performing the reduced beam sweep includes receiving beam information based on the one or more of the reference signal, the sounding signal, the pilot signal, or the synchronization signal that was transmitted. Selecting the beam out of the reduced set of beams may include selecting the beam based on the beam information that was received. The beam information may include information related to one or more signal characteristics associated with the one or more of the reference signal, the sounding signal, the pilot signal, or the synchronization signal that was transmitted.

Other operations according to any of the embodiments described herein may also be performed.

BRIEF DESCRIPTION OF THE DRAWINGS

FIGS. 1A and 1B illustrate communication between a node and a mobile device, according to various embodiments described herein.

FIG. 5 illustrates a beam sweep from an array of antennas in a wireless device, according to various embodiments described herein.

FIGS. 6 to 8 illustrate beam sweeps and data transmission, according to various embodiments described herein.

DETAILED DESCRIPTION

Figure 1B:
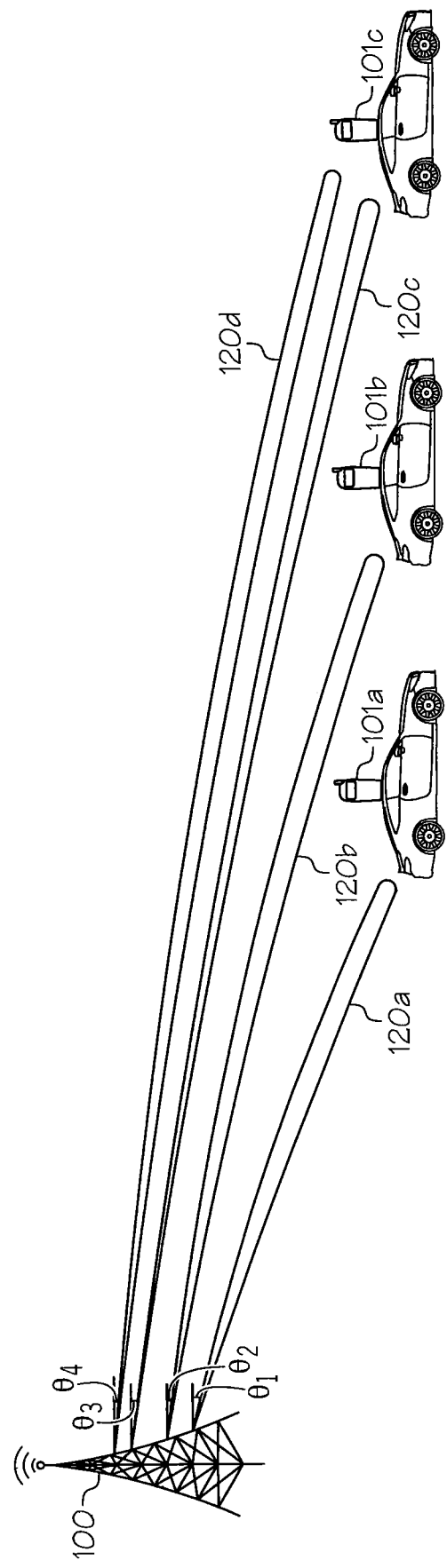

Various embodiments will be described more fully hereinafter with reference to the accompanying drawings. Other embodiments may take many different forms and should not be construed as limited to the embodiments set forth herein. Like numbers refer to like elements throughout.

Wireless communication between two devices such as a network node and a mobile device involves data signals that are transmitted between the antennas of the mobile device and the node. These signals may be directional and may be transmitted in beams that are aligned from one device to the other. Multiple beams may be available for transmitting signals between the node and the mobile device. Beam sweeping may be conducted to evaluate various ones of the available beams for selection based on a variety of criteria. However, beam sweeping increases overhead and introduces latency of the data signals that are transmitted between the node and mobile device.

Various embodiments described herein may arise from the recognition that improved methods for beam sweeping to select beams for wireless communication between devices are needed to reduce signaling overhead and/or to reduce latency of data transfers between devices. Specifically, solutions to perform reduced beam sweeps of a subset of a full set of beams with more intelligent selection of beams for wireless communication will be discussed in detail. Reduced beam sweeps may substantially reduce signaling overhead and/or the latency of data transmission between devices.

Devices may control antenna array elements to form customized narrow beams that are used for transmission of information between the devices. These beams may transmit a data signal over multiple paths so that signals arrive at the receiving device at various signal strengths and/or with different noise and/or interference characteristics. The beams may also include nulls or other signal degradations based on channel characteristics. Devices may use channel information and/or measured beam characteristics to select one or more beams for transmitting and/or receiving data signals. Directional beams may be selected that mitigate the interference between devices, improve the signal-to-interference and/or signal-to-noise ratios, and/or have higher signal strength at the receiver. Selection of the beam used for communication may be accomplished by evaluating various available beams in a procedure referred to as beam sweeping. Beams available for communication are formed by a process referred to as beam forming.

Wireless communication at higher frequencies may use multiple antenna elements that have small apertures or receiving cross-sections of the antenna elements. For example, in higher frequency systems such as LTE and/or New Radio (NR) 5G operating in ranges such as 30 to 60 GHz, sixteen antenna elements may be needed in a mobile device. Beam forming (BF) combines signals from several correlated antenna elements such that the signals from the collective antenna module will be directive. Beam forming leads to a number of challenges such as the need for beams from two devices to point to each other for beam alignment such that the transmit and receive beams need to be directed in the same direction. Issues related to beam forming are discussed in the 3GPP New Radio (NR) forum topic of beam management. Solutions for beam forming include Digital Beam Forming (DBF), Hybrid Beam Forming (HBF), and Analog Beam Forming (ABF).

In ABF, phase shifters, usually in the radio frequency (RF) domain, are placed in series with the antenna elements and are tuned so that a beam is shaped with proper amplitude and/or phase that are appropriate for communication with the antenna elements. The relative phases of signals from the phase shifter are altered in order to steer the beam in a desired direction to a receiving device. An antenna array needs a number of beams as there are antenna elements in order to cover the complete coverage area. These number of beams correspond to a full beam set.

The precoding matrix in LTE and/or NR 5G systems may include parameters for the adjustable phase shifters. The precoding matrix with parameters related to the phase shifters may be stored in a memory or may be derived from a pilot sequence that is sent over an information channel available for data transmission between devices. The parameters for the phase shifters for a specific beam direction may be different for different radio frequencies (RF) and may be valid for a small frequency range. However, a drawback with ABF may be that the tuning angle for an analog array may be valid for a narrow frequency band. This narrow frequency band may be challenging for Frequency Division Duplex (FDD) operation and/or Time Domain Duplex (TDD) operation since large channel bandwidths are anticipated for 5G applications. The channel bandwidth in FDD and/or TDD operation may need to be split into different bands with separate hardware addressing for different bands. In cases of FDD operation where uplink and downlink communications use different frequency bands, uplink and downlink beams may need to be aligned. Side-link based device to device (D2D) communication may also use different frequency bands for uplink and downlink with beams that need to be aligned.

Another drawback with ABF is that, in order to determine the correct beam configuration, both at the base station (BS) and at the user equipment (UE), all possible combinations of beam configuration may need to be tested in sequence. As used herein, a base station (BS) may be a radio access network node, radio head, distributed antenna access point, or similar network entities. The terms mobile device and/or UE used herein may be any type of wireless device capable of communicating with a network node, such as a base station, or another mobile terminal over radio signals. The mobile device and/or UE may also be a radio communication device, target device, device to device (D2D) UE, machine type UE or UE capable of machine to machine communication (M2M), a sensor equipped with UE, tablet, mobile terminals, smart phone, laptop embedded equipped (LEE), laptop mounted equipment (LME), USB dongles, Customer Premises Equipment (CPE), etc.

Some advantages of ABF over DBF may include savings in power due to additional circuitry required by DBF. In the case of ABF, signals from different antennas may be combined and fed to an analog-to-digital (A/D) converter. In general, the sampling rate at the A/D converter may be about two times the bandwidth of the desired signal. In high bandwidth applications such as GHz frequency range communications, this sampling rate may be current draining. This minimum required sampling rate for ABF leads to lower power consumption for ABF when compared to DBF. For DBF, each antenna needs a dedicated A/D converter such that the number of A/D converters is at least the number of antenna elements. Thus, the current consumption by the antenna elements thus increases by at least the number of A/D converters. In other words, an issue with DBF is that many A/D converters are needed whereas for ABF a single A/D converter may be enough. Therefore, compared to ABF, DBF uses a larger number of A/D converters, thus increasing power consumption.

ABF may be used in legacy wireless communication systems for ease of implementation. Since ABF uses a single beam at a time, a beam sweep to determine a suitable beam for communication would be needed. Since devices used in the wireless communication systems are mobile, beam configuration based on, for example, pilot beam sweeping, may need to be repeated in every coherence time interval. The coherence time interval is a time period in which a beam selection is valid and/or within which the beam selection for communication must be evaluated or reevaluated to provide a usable communication beam. Factors such as changes in channel conditions such as interference, multipath fading, environmental effects, etc., and/or movement of the mobile device may affect communication on a beam in use. Therefore, the validity of the beam in use for communication changes over time. Before expiry of the coherence time interval, a beam sweep should be conducted to select, reselect, and/or update a beam for communication. This repeated beam sweeping may lead to increased overhead and/or latency problems.

In some embodiments, separate beam selection at both the base station and the mobile device may be necessary. The receive and transmit beams may be different for a device. In other words, a device may receive data in the receive direction on a beam that is different from the beam used for communication in the transmit direction. An example situation where different beams are used for the transmit and receive directions is when there is an interferer between a base station and a mobile device. The mobile device may be able to direct the receive beam toward a weaker reflection beam that has a higher signal-to-interference ratio (SINR) but may still transmit in a different direction with larger absolute power. In some embodiments, the coherence time interval at the base station may be different from the coherence time interval used at the mobile device. In other words, the beam selection at the base station and the mobile device may not be updated at the same update rate. From the base station viewpoint, beam selection may be based on the mobile device's position within the coverage area. An update rate or coherence time may be dependent on the speed of the mobile device, direction of movement, and/or the number of base station antennas which may influence the narrowness of the beams.

From a mobile device perspective, the coherence time may be determined by a change in an angle of the beam from of the BS, which is related to, for example, movement of the mobile device. An extreme case that is considered is when the mobile device rotates A UE rotation may yield higher angular speed than a linear movement in one direction, particularly when the distance to the base station is large. As the beam coherence times are different from the UE and base station perspectives, different beam selecting and/or beam steering processes and/or coherence times may be applied for the base station than for the UE.

Referring now to FIG. 1A, a base station 100 may communicate with a mobile device 101. Assuming ABF, communication may need to be initiated by a full beam sweep where all beam angles in an area covered by the base station are scanned such that a beam with the strongest power is selected. In some cases, the full beam sweep may include a coverage area that is a portion of the area covered by the base station. Such extensive beam sweeping may be needed occasionally both to make sure that the current base station and/or beam are optimal for communication with the mobile device, but also during scanning for alternative base stations that may provide better service.

Various embodiments described herein may arise from the recognition that a full beam sweep may not be necessary at every scan for each coherence time interval. Data transmission may be partitioned in terms of frames for the data. For example, Long Term Evolution (LTE) frames typically allocate dedicated resources for different purposes, such for sound reference signals (SRS), uplink pilot signals, downlink reference signals (DL-RS), demodulation reference signals (DM-RS) etc. In a similar fashion, dedicated resources may be used for the beam sweeps, as discussed herein. In LTE, as well as in NR/5G technologies, frames included multiple repeated sub-frames. The sub-frame is the smallest time resource containing the necessary signaling and data. A limited or reduced beam sweep at certain points in the frame, such as, for example, the beginning of each frame may be conducted. This reduced beam sweep may not evaluate all beam angles in the full beam sweep but a subset of the beam angles of the full beam sweep. The reduced beam sweep allows for a fast update of the beam direction, instead of doing a more time consuming, resource intensive full beam sweep. Thus, as described herein, a full beam sweep may be conducted occasionally or based on a trigger event such as crossing a signal to noise ratio (SNR) threshold while the reduced beam sweep may be performed once every coherence time interval.

Referring now to FIG. 1B, the mobile device 101 of FIG. 1A is shown travelling in an automobile, with the changing locations as illustrated by mobile devices 101a, 101b, and 101c at various points in time. At a first time interval, beam 120a with a scanning angle of $\theta_1$ is selected for the location of the mobile device 101a. At a second time interval, beam 120b with a scanning angle of $\theta_2$ is selected for the location of the mobile device 101b. At a third time interval, a reduced set of beams may be scanned. The reduced set of beams may be based on a difference between the angles of $\theta_1$ and $\theta_2$. This difference between the angles of $\theta_1$ and $\theta_2$ may indicate a direction of travel of the mobile device to be in the direction of candidate beams $\theta_3$ and $\theta_4$. Therefore, candidate beams $\theta_3$ and $\theta_4$ may be scanned in the third time interval for the location of mobile device 101c. Thus the candidate set of $\theta_3$ and $\theta_4$ are a reduced set of beams for the reduced beam sweep, since the direction of travel of the mobile device is predicted based on previous selections based on previous reduced beam sweeps. The example embodiment related to FIG. 1B assumes a base station beam sweep process where the mobile device's beam setting is independent of that of the base station. For the received beam setting, this embodiment assumes that the mobile device transmits a reference signal, a sounding signal, a pilot signal, and/or a synchronization signal that the base station may probe.

Figure 2A:
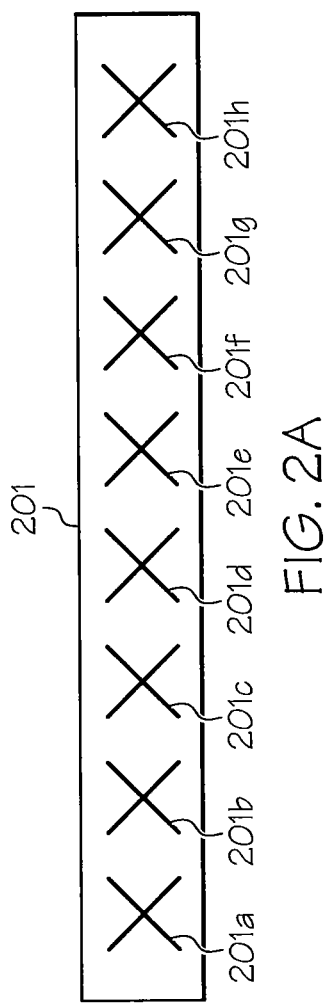
FIG. 2A illustrates a linear array antenna, according to various embodiments described herein.
Figure 3A:
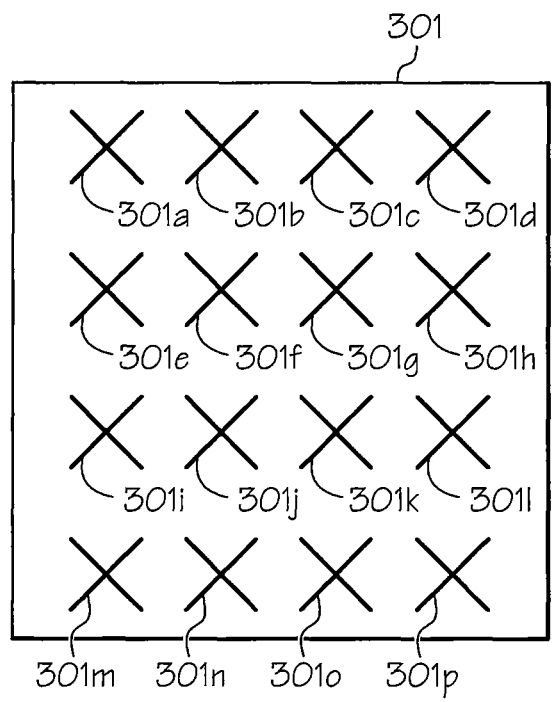
FIG. 3A illustrates a two-dimensional array antenna, according to various embodiments described herein.

The beam sweeps described above may be performed by an antenna module that includes an array of antenna elements that perform beam forming activity, as illustrated, for example, in FIGS. 2A and 3A. Referring now to FIG. 2A, an antenna module 201 may include antenna elements 201a-201h. Fewer or larger numbers of antenna elements may be used. The array antenna module 201 is an array antenna arranged in a linear array. The linear antenna module 201 may be used, for example, for signals in frequencies around 30 GHz. Two or more antenna elements may be used for beam forming for directional signal transmission or reception. Beam forming is achieved by combining elements in a phased array such that signals at particular angles experience constructive interference while other signals experience destructive interference. Increasing the number of antenna elements participating in beam forming increases the directivity of the resulting beam. For example, doubling of the number of elements used in beam forming results in the directivity being approximately doubled, thus resulting in twice the array gain (i.e. 3 dB) in the direction of the beam which is set by the relative phases. However, in this example, the beam width of the resulting beam becomes half as wide since the power of the resulting beam is effectively concentrated in a narrower beam with constrained power. Therefore, the total power is the same in both of these cases.

Beam forming can be used at both the transmitting and receiving ends in order to achieve spatial selectivity. Beam forming can provide improved performance when compared with omnidirectional reception and/or transmission due to the directivity of the signal from the antenna elements. Adaptive beam forming is used to detect and estimate the signal of interest at the output of a sensor array using techniques such as spatial filtering and interference rejection.

For the beam sweep, each of the candidate beams considered in the beam sweep would be based on the same antenna elements that are fed with the same signal with different phase relations to select a particular one of the candidate beams for use in communication. If all signals are fed to antenna elements 201a-201h with the same signal and have a zero degrees phase offset, a bore site directed beam is achieved. A bore site directed beam is propagated in the direction which is orthogonal to the flat front of the array. If a ten degree phase increase is applied from one antenna element to an adjacent antenna element, the resulting beam will be directed with an offset to the bore site directed beam. The beam angle may be geometrically derived based on distances between antenna elements 201a-201h. For example, if the distance between antenna elements is a half of a wavelength and the phase offset between signals fed to adjacent antenna elements is 22.5 degrees (for example, wavelength divided by 4), a 30 degree beam offset from the bore site is achieved. In other words, the phase offset between signals may be based on the distance between antenna elements.

Figure 2B:
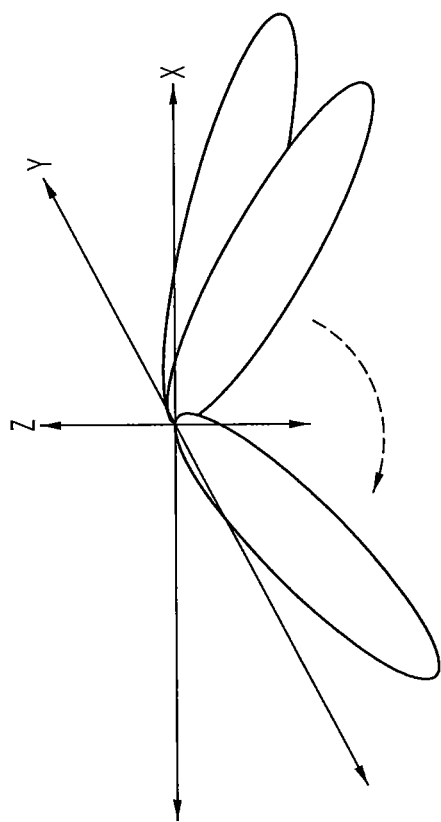
FIG. 2B illustrates beams radiating in two dimensions from the linear array antenna of FIG. 2A, according to various embodiments described herein.

Referring now to FIG. 2B, two or more antenna elements 201a-201h of FIG. 2A may be used to form the signal beams. Each of the antenna elements 201a-201h have an omnidirectional gain pattern or a gain pattern that covers some part of the area surrounding the antenna element. Each of these antenna elements 201a-201h are fed with the same signals with phase offsets from one another to achieve beam forming. The gain pattern of each individual antenna element sets the boundary of the area and/or direction for achieving array gain using multiple antenna elements. Since the antenna module 201 of FIG. 2A is a linear array antenna, the resulting signal beams are directed in a two dimensional space in the x-y plane. In this example embodiment, the beam forming may occur in an angle spanning about 90 degrees around the antenna module. In other words, a full beam sweep of the antenna module 201 of FIG. 2A would result in sweeping of various beams covering about a 90 degree span.

Figure 3B:
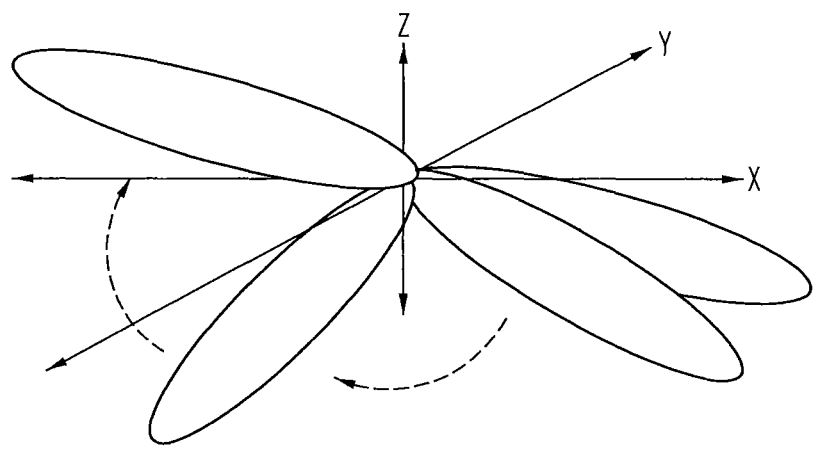
FIG. 3B illustrates beams radiating in three dimensions from the two-dimensional array antenna of FIG. 3A, according to various embodiments described herein.

Referring now to FIG. 3A, an antenna module 301 may include antenna elements 301a-301p. In this example embodiment, the antenna module 301 comprises a two-dimensional array antenna arranged in a two dimensional matrix of antenna elements 301a-301p. Fewer or larger numbers of antenna elements may be used. The antenna module 301 may be used, for example, for signals in frequencies in the 30 GHz to 100 GHz range. Referring now to FIG. 3B, two or more antenna elements 301a-301p of FIG. 3A may be used to form the signal beams. Since the antenna module 301 of FIG. 3A is a two-dimensional array antenna, the resulting signal beams may be directed in three dimensions, for example, as defined by the x-y-z planes. In this example embodiment, the beam forming may occur in an angle spanning about 90 degrees from the antenna module in the x-y plane and/or in about an angle spanning 60 degree in the z direction. In other words, a full beam sweep of the antenna module 201 of FIG. 3A may result in sweeping of various beams covering about a 90 degree span in the x-y plane and/or about a 60 degree span in the z direction.

Figure 4:
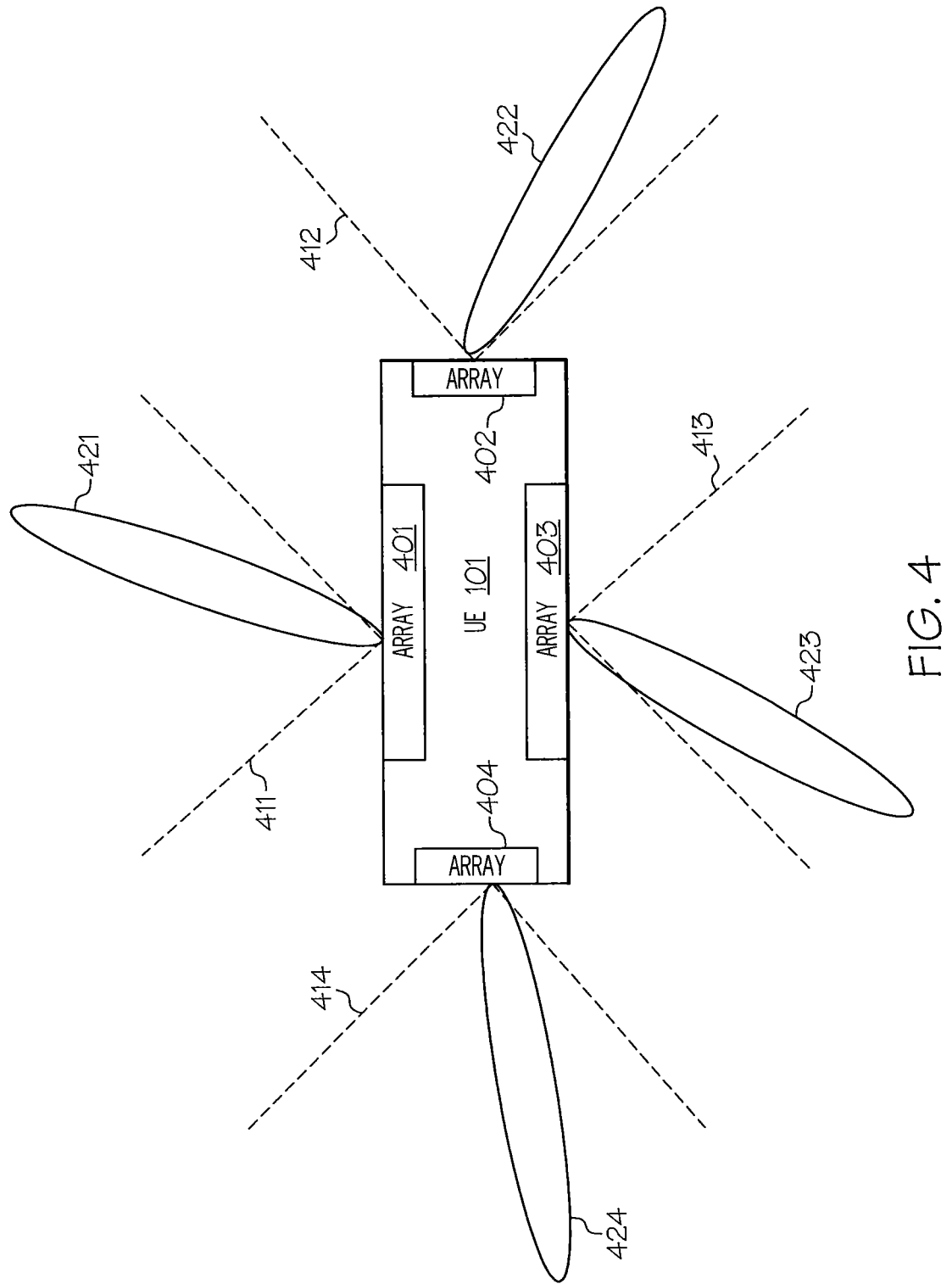
FIG. 4 illustrates various beams from arrays of antennas in a wireless device, according to various embodiments described herein.

FIG. 4 illustrates a wireless device 101 of FIG. 1A, that generates various beams for transmitting and/or receiving communication signals. Referring now to FIG. 4, four array antenna modules 401, 402, 403, and 404 are illustrated. Each of these array antenna modules may be configured, for example, as the linear antenna array of FIG. 2A or the two dimensional antenna array of FIG. 3A. Antenna module 401 may sweep area 411 that includes beam 421. Antenna module 402 may sweep area 412 that includes beam 422. Antenna module 403 may sweep area 413 that includes beam 423. Antenna module 404 may sweep area 414 that includes beam 424. Although FIG. 4 illustrates that the beam directions of each of the antenna modules 401, 402, 403, and 404 do not overlap, in some embodiments, the beams resulting from these antenna modules may overlap.

FIG. 5 illustrates the wireless device 101 with antenna modules 401, 402, 403, and 404 of FIG. 4. Referring now to FIG. 5, antenna module 403 has a beam coverage area 413. A full beam sweep may span the beam coverage area 413. Beams 501, 502, 503, and/or 504 are example beams that are evaluated during a beam sweep. A reduced beam sweep would include subset of the available beams for a full beam sweep in beam coverage area 413 such as only beams 501-503.

FIGS. 6 to 8 include example embodiments of beam sweeps in any of the embodiments of FIGS. 1A, 1B, 2A, 3A, 4, and/or 5. FIGS. 6 to 8 illustrate time along the x-axis to illustrate beam sweeps and data transmission at various times according to some embodiments described herein. Referring to FIG. 6, a full beam sweep of all available beams 601 may be performed at the beginning of a data transmission or reception. The full beam sweep occurs before transmitting or receiving of data and would include all of the available beams 601 in the beam coverage area. Data 620, 630, and/or 640 may then be sent using the beam selected from the full beam sweep.

Referring to FIG. 7, a reduced beam sweep may be performed such that one candidate beam 701 is evaluated, after which a small amount of data 720 is transmitted or received on a selected beam. The selected beam may be the candidate beam 701 that was evaluated, or another beam from a previous full beam sweep, as discussed with respect to FIG. 6. Another candidate beam 702 may then be evaluated. After selecting a beam for transmission or reception responsive to the evaluation of candidate beam 702, data 730, 740, 750, and/or 760 may be transmitted or received. The reduced beam sweep may improve performance in terms of power consumption of the wireless device and/or reduce latency of the data transmission.

FIG. 8 illustrates a distributed reduced beam sweep. Referring to FIG. 8, data 810 and/or 820 may be transmitted or received based on a previous full beam sweep. A coherence interval may expire at the end of the transmission or reception of data 820. A reduced beam sweep may be performed according to a pattern. As a non-limiting example pattern, an evaluation of one or more candidate beams 801 may occur at the end of the coherence interval. Data 830 may be transmitted or received based on the reduced beam sweep 801. The coherence interval may expire after data 830 is transmitted or received, triggering another reduced beam sweep 802. Similarly, after data 840 is transmitted, a reduced beam sweep 803 may be then performed and data 850 may be transmitted or received. Reduced beam sweeps 801, 802, and/or 803 may be triggered at the end of a coherence time interval such that a reduced beam sweep occurs once every coherence time interval. A full beam sweep may occur based on a trigger event such as reaching a threshold level of the SNR of the signal. The distributed reduced beam sweep reduces power consumption of the wireless device and/or reduces latency of data transmission since less overhead information related to the beam sweep is transmitted between data transmissions.

Still referring to FIG. 8, different received beams may be evaluated in different slots of sub-frames within the coherence time interval and communications occur using a suitable selected beam. The slots may be distributed for the reduced beam sweep such that the device may test the different beams according to a pattern. Each time a new beam is selected that is different from the previously selected beam, the pattern may be updated to use beams likely to be used subsequently. For example, if the beam experiences a direction change in a given direction, the subsequent beam evaluated may be a beam in the same direction as the given direction, since the device may likely continue to move in the same given direction. As discussed herein, the device may be the mobile device 101 of the base station 100 of FIG. 1A and/or FIG. 2B, each of which may include the antenna module 201 of FIG. 2A and/or the antenna module 301 of FIG. 3A. Similar approaches for selection of beams to evaluate in the reduced beam sweep may be applied in the transmit and/or receive links associated with the mobile device or with the base station of FIG. 1A and/or FIG. 1B.

Figure 9:
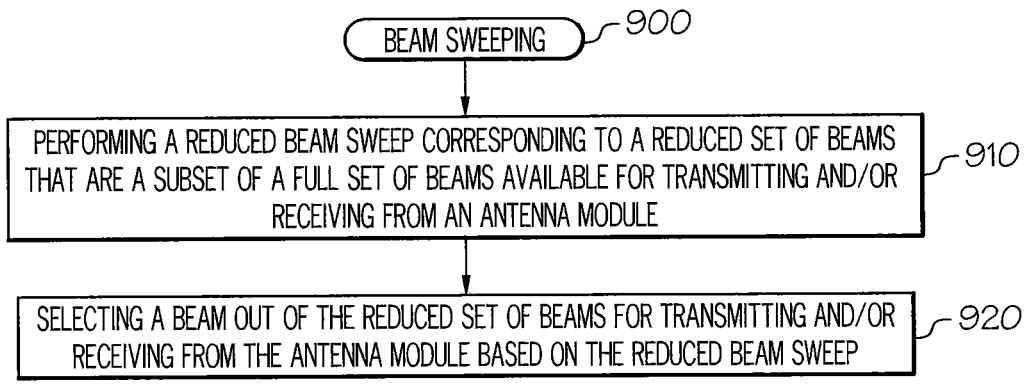
FIGS. 9 to 15 are flowcharts of operations for beam selection using beam sweeping in a wireless communication system, according to various embodiments described herein.

FIGS. 9 to 15 are flowcharts of operations for beam selection using beam sweeping, according to various embodiments. Referring to FIG. 9, beam sweeping, at block 900, may be performed in a wireless communication system that includes Digital Beam Forming (DBF), Hybrid Beam Forming (HBF), and/or Analog Beam Forming (ABF). A reduced beam sweep corresponding to a reduced set of beams that are a subset of a full set of beams available for transmitting and/or receiving from an antenna module is performed, at block 910. The reduced beam sweep is a subset of the full set of beams such that the reduced beam sweep is performed without sweeping beams that are not members of the reduced set of beams. A beam is selected out of the reduced set of beams for transmitting and/or receiving from the antenna module based on the reduced beam sweep without sweeping beams that are not members of the reduced set of beams, at block 920. The reduced beam sweep may be performed by scanning a reduced set of beam angles corresponding to the reduced set of beams. The full set of beams may correspond to a full set of beam angles available for transmitting and/or receiving by the antenna module, as illustrated, for example, in FIGS. 2B, 3B, 4, and/or 5.

Figure 10:
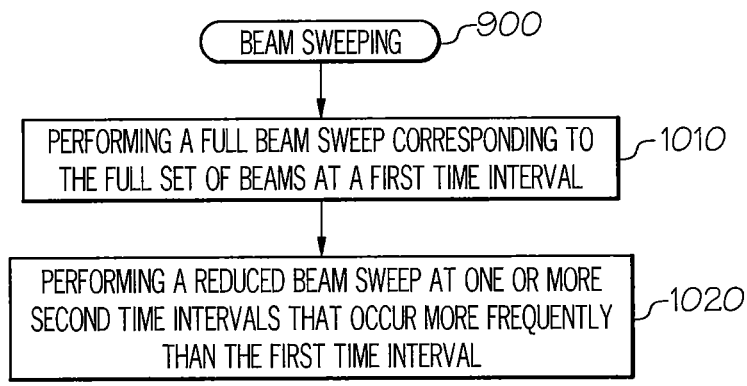

Referring now to FIG. 10, beam sweeping may include performing a full beam sweep corresponding to the full set of beams at a first time interval, at block 1010, by any of the antenna modules illustrated, for example, in FIGS. 2B, 3B, 4, and/or 5. Performing the full beam sweep at block 1010 may be triggered by the occurrence of a trigger event. The trigger event may include measurements such as SNR, SINR, signal power, etc. falling below a threshold. In some embodiments, the full beam sweep may be triggered after a given amount of time has elapsed.

Still referring to FIG. 10, the reduced beam sweep may be performed at one or more second time intervals that occur more frequently than the first time interval, at block 1020, by any of the antenna modules illustrated, for example, in FIGS. 2B, 3B, 4, and/or 5. In other words, the reduced beam sweep may occur more frequently than the full beam sweep. The reduced beam sweep may be performed within a coherence time interval since a previous reduced beam sweep or a full beam sweep. The reduced beam sweep may be performed once per the coherence time interval, in some embodiments.

A resource allocation structure including resource elements and/or resource blocks may be defined in both the time domain and in the frequency domain. The resource elements and/or resource blocks may be used during the full beam sweep and/or the reduced beam sweep. In the time domain, transmissions may organized into frames that are a specific time length, such as 10 msec in length of time. Each frame may be composed of several subframes. Each subframe may be made up of slots that are composed of several symbols. In the frequency domain, a subcarrier may be allocated to a symbol. The unit of resource allocation is referred to as a resource element and is composed of one subcarrier and one symbol. A resource block may include two or more resource elements. Each beam of the full set of beams for the beam sweep may occupy a resource element. The reduced beam sweep uses the same resource elements. In some embodiments, a resource block including multiple resource elements may be used for each beam. If the set of resource elements that are used is reduced to achieve a wider beam for increased robustness, the power used for each resource element must be increased to achieve the same signal power in the wider beam.

Figure 11:
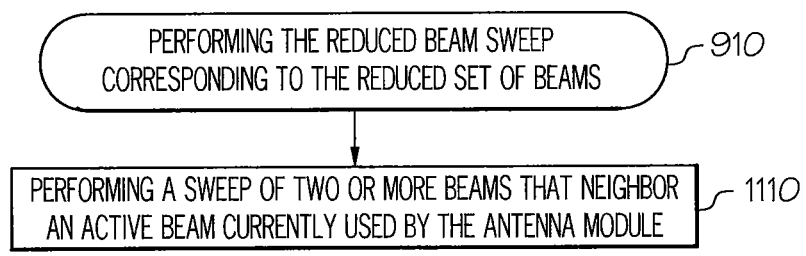

Referring now to FIG. 11, performing the reduced beam sweep may include performing a sweep of two or more beams that neighbor an active beam currently used by the antenna module, at block 1110. As discussed in relation to FIG. 1B, the mobile device may be predicted to be in a beam path based on previous selections of the beams for communication such that beams that neighbor an active beam currently in use are more likely to be selected by a subsequent beam sweep. This approach of using neighboring beams as candidates for the reduced beam sweep is a beam tracking approach. For a two dimensional array antenna such as antenna module 301 of FIG. 3A, the subset used in the reduced beam sweep may include at least three neighboring beams. However, more beams may be included in the reduced set of beams based on the mobility of the device and/or other information from mobility sensors and the like. The number of antenna elements used by the antenna module in forming the beams affects the beam width, which may be factored in selecting candidate beams for the reduced beam sweep. In some embodiments, portions of the reduced beam sweep may be distributed according to a pattern across a data transmission by interleaving portions of the reduced beam sweep with portions of the data transmission, as previously discussed with respect to FIG. 8. The pattern may be periodic, or may be aperiodic with the period dynamically adjusted based on a dynamic coherence interval based on channel conditions, etc.

Figure 12:
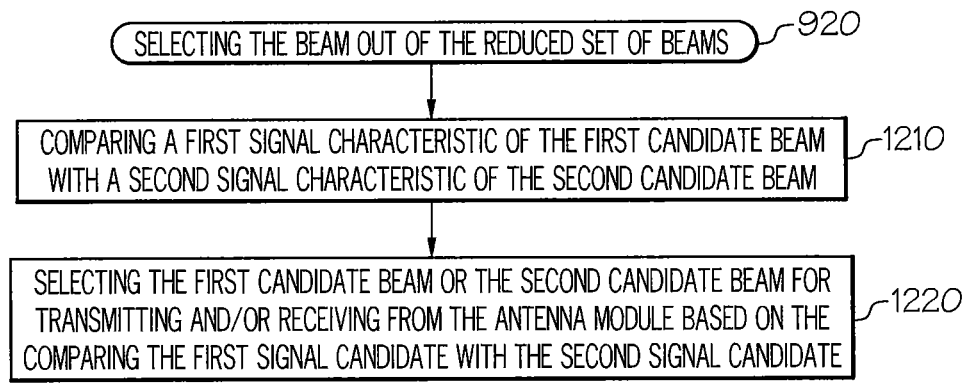

In some embodiments, two or more candidate beams may be evaluated to determine respective signal characteristics. Signal characteristics may include, signal strength, signal power, SNR, SINR, signal latency, etc. For example, a first candidate beam of the reduced set of beams may be evaluated to determine a first signal characteristic and a second candidate beam of the reduced set of beams may be evaluated to determine a second signal characteristic. Referring now to FIG. 12, in this scenario, at block 920, selecting the beam out of the reduced set of beams may include comparing the first signal characteristic of the first candidate beam with a second signal characteristic of the second candidate beam, at block 1210. The first candidate beam or the second candidate beam may be selected for transmitting and/or receiving from the antenna module based on comparing the first signal characteristic with the second signal characteristic, at block 1220.

Figure 13:
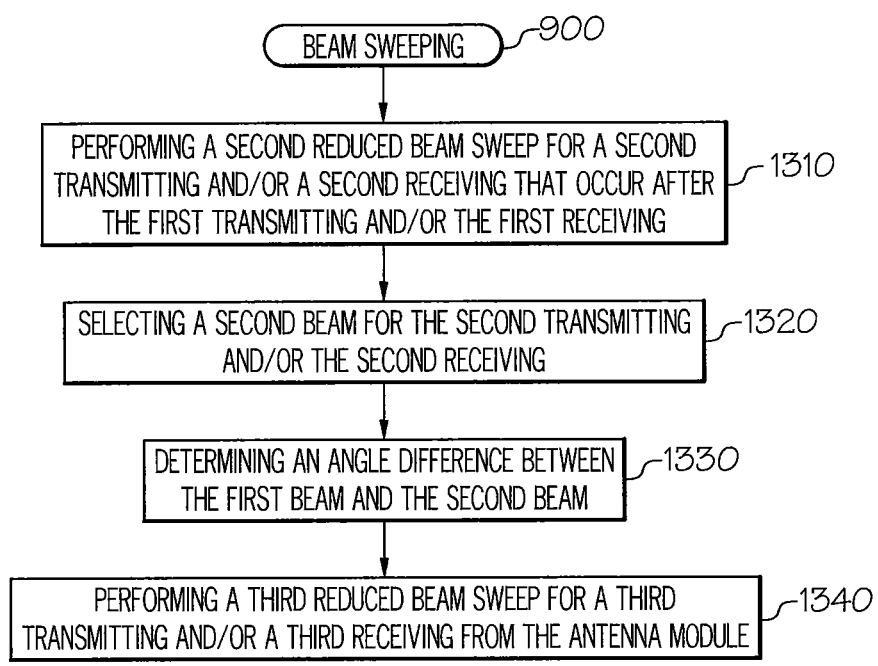

In some embodiments, a history of previous beam sweeps may be used in performing subsequent reduced beam sweeps. Referring now to FIG. 13, at block 900, a first reduced beam sweep may be performed to select a first beam for a first transmitting and/or receiving of data. A second reduced beam sweep may be performed for a second transmitting and/or receiving of data that occur after the first transmitting and/or receiving, at block 1310. A second beam may be selected based on the second reduced beam sweep for the second transmitting and/or receiving, at block 1320. An angle difference between the first beam and the second beam are determined, at block 1330. A third reduced beam sweep is performed for a third transmitting and/or receiving from the antenna module, at block 1340. The third reduced beam sweep includes scanning beam angles based on the angle difference that was determined. In some embodiments, as illustrated in FIG. 1B, a direction of travel of the mobile device may be determined based on the angle difference between the first beam and the second beam that were selected. In other words, the angle difference indicates a direction of travel of the mobile device relative to a location of the antenna module. The subsequent scanning of beam angles may be performed in the direction of travel of the mobile device.

Figure 14:
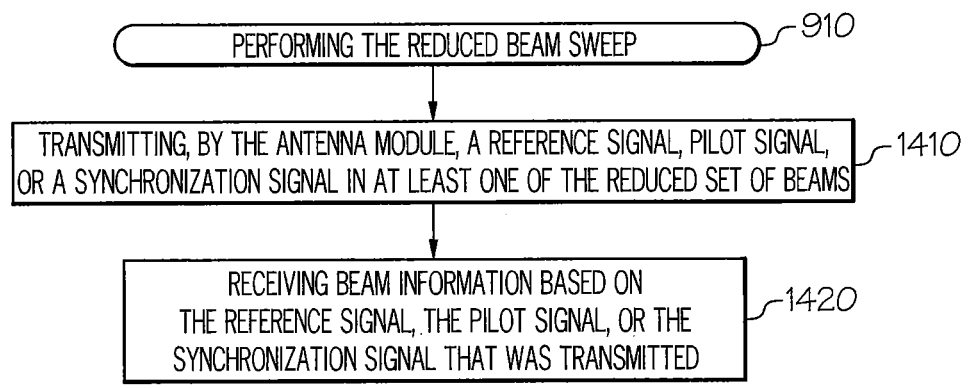

Referring now to FIG. 14, performing the beam sweep may include transmitting, by the antenna module, a reference signal, a sounding signal, a pilot signal, and/or a synchronization signal in at least one of the reduced set of beams, at block 1410. In some embodiments, resource slots and/or time frequency resources may be used for reduced beam sweeps to test different antenna modules for devices that have multiple antenna array modules for increased coverage. Beam information is received based on the reference signal, the sounding signal, the pilot signal, and/or the synchronization signal that was transmitted, at block 1420. The beam may be selected based on beam information that was received. The beam information includes information related to one or more signal characteristics such as received signal strength, signal to noise ratio, or signal to interference ratio associated with the reference signal, the sounding signal, the pilot signal, and/or the synchronization signal.

In some embodiments, performing the beam sweep may include receiving, by one side of a wireless communication system, a reference signal, a sounding signal, a pilot signal, and/or a synchronization signal in at least one of the reduced set of beams. Beam information may be determined based on the one or more of the reference signal, the sounding signal, the pilot signal, or the synchronization signal that was transmitted by the other side of the wireless communication system. Hence, the UE is not transmitting the pilot signal to itself but, UE may be transmitting pilot signals on dedicated resources and at the same time receiving different pilot signals transmitted by the opposite side of the wireless communication system. The pilot signals transmitted by the UE aide the base station's beam tracking process and the received pilot signals aide the UE's beam tracking process. In other words, these two processes may be independent of one another.

Figure 15:
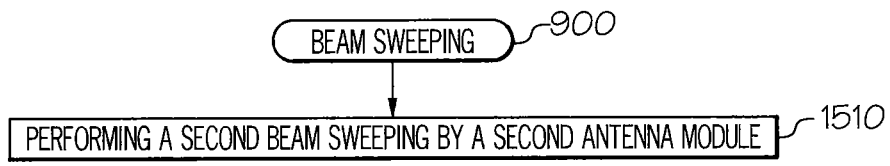

Referring now to FIG. 15, beam sweeping may include a first antenna beam sweep that is performed by a first antenna module 401 of FIG. 4 for selecting a first beam. A second antenna beam sweeping may be performed by a second antenna module such as antenna module 402 of FIG. 4. The second antenna beam sweeping includes selection of the second beam by the second antenna module independently of the first antenna beam sweeping performed by the first antenna module, at block 1510.

Figure 16:
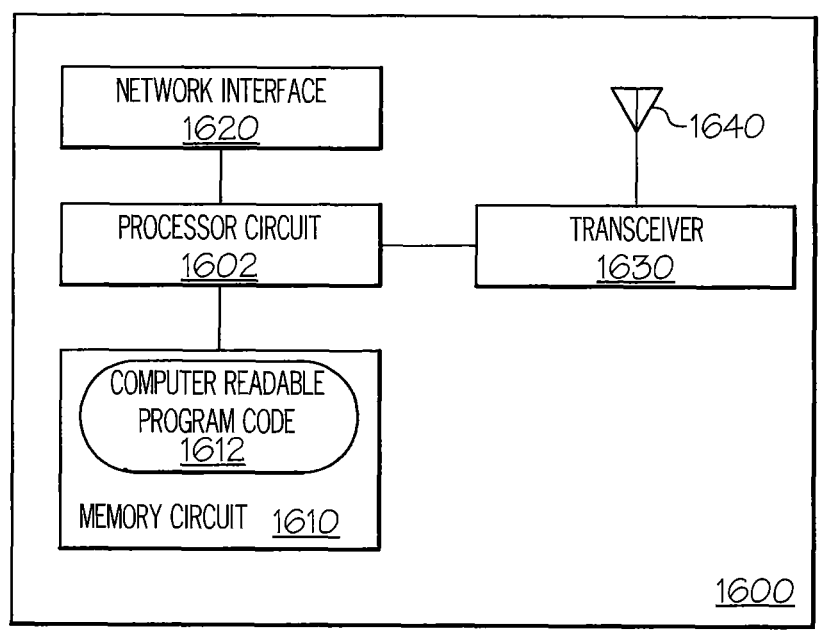
FIGS. 16 to 17 are block diagrams of wireless electronic devices, according to various embodiments described herein.

FIG. 16 is a block diagram of antenna module 1600 of a wireless electronic device such as mobile device 101 or the base station 100 of FIG. 1. The antenna module 1600 is configured to perform operations according to one or more embodiments disclosed herein. Referring to FIG. 16, the antenna module 1600 includes a radio transceiver circuit 1630, a processor circuit 1602, and a memory circuit 1610 containing computer readable program code 1612. The processor circuit 1602 may include one or more data processing circuits, such as a general purpose and/or special purpose processor, e.g., microprocessor and/or digital signal processor, that may be collocated or distributed across one or more networks. The processor circuit 1602 is configured to execute the computer readable program code 1612 in the memory 1610 to perform at least some of the operations and methods of described herein as being performed by the antenna module 1600. Antenna hardware 1640 may be used for signal propagation. The network interface 1620 is coupled to the processor circuit 1602 and communicates with base station 100 and/or mobile device 101 of FIG. 1A, directly or indirectly.

Figure 17:
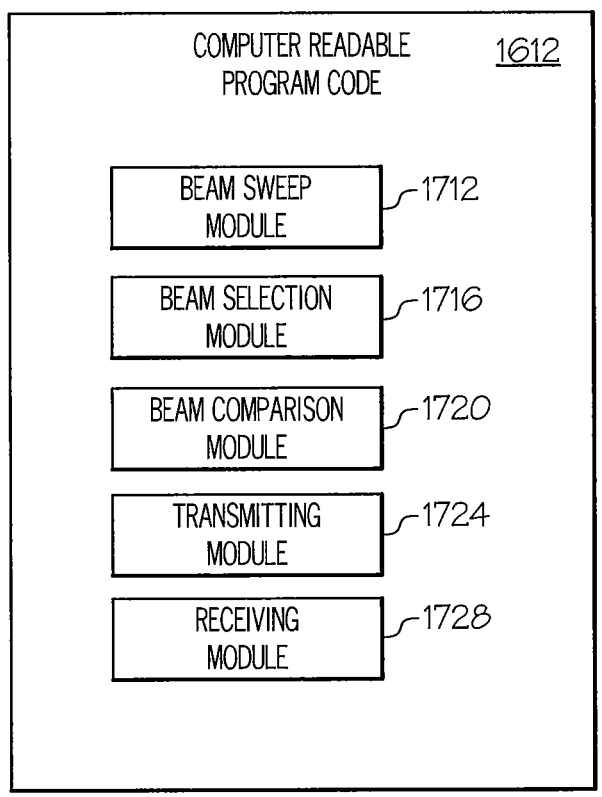

FIG. 17 illustrates modules for an antenna module that perform operations as disclosed herein according to some embodiments. The modules include a beam sweep module 1712, a beam selection module 1716, a beam comparison module 1720, a transmitting module 1724 and a receiving module 1728. The beam sweep module 1712 is for performing a reduced beam sweep (block 910 of FIG. 9) and/or performing a full beam sweep (block 1010 of FIG. 10). The beam selection module 1716 is for selecting a beam (block 920 of FIG. 9). The transmitting module 1724 is for transmitting data where as the receiving module 1728 is for receiving data. The modules 1712, 1716, 1720, 1724, and 1728 perform other corresponding operations and methods disclosed herein.

Various embodiments presented herein have described improved methods for beam sweeping to select beams for wireless communication between devices. The reduced beam sweeps may be performed using more intelligent selection of beams for wireless communication. The techniques for beam sweeping described herein can reduce signaling overhead and/or reduce latency of data transfers between devices.

Further Embodiments

In an example embodiment, a mobile device may have four to sixteen antenna elements while a base station may have significantly more antenna elements, such 50 to 500. This case provides many more beams at the base station. As such, beam reciprocity is more likely at the base station. The transmit and receive beams at the mobile device and the base station may be described as follows.

1. mobile device-transmit beam
   a. The base station transmits sounding signals (pilots etc.) that are on dedicated resources. There is a fixed beam setting at the base station, which may be the same as the active beam.
   b. The mobile device may use different receive beam settings to evaluate a desired setting. In the is case, the mobile device has the opportunity to use a reduced beam set.
   c. If the mobile device has beam reciprocity (i.e. rx beam=tx beam), this downlink beam evaluation result can be applied at the mobile device's transmit beam.
2. mobile device-RX beam.
   a. A mobile device may transmit sounding signals on dedicated resources. The mobile device can use the reduced beam set in this case.
   b. The base station may use the active receive beam setting to evaluate the received signals. The base station may report back to the mobile device as to which beam should be selected.
3. base station-TX beam.
   a. A mobile device may transmit sounding signals (pilots etc.) on dedicated resources. There may be fixed beam setting at the mobile device, that may be the same as the active beam.
   b. The base station may use different receive beam settings to evaluate the various settings. The base station has the opportunity to use a reduced beam set.
   c. If the base station has beam reciprocity (i.e. rx beam=tx beam), this uplink beam evaluation result can be applied at the base station transmit beam.
4. base station-RX beam.
   a. The base station may transmit a sounding signal on dedicated resources. The base station can use the reduced beam set in this case.

b. The mobile device may use the active receive beam setting to evaluate the received signals and may need to report back to the base station as to which beam should be selected.

Further Definitions

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

The invention claimed is:

1. A method for beam sweeping in a wireless communication system, the method comprising:
    performing a reduced beam sweep corresponding to a reduced set of beams that are a subset of a full set of beams available for transmitting and/or receiving from an antenna module, without sweeping beams that are not members of the reduced set of beams;
    selecting a beam out of the reduced set of beams for transmitting and/or receiving from the antenna module based on the reduced beam sweep without sweeping beams that are not members of the reduced set of beams; and
    performing a full beam sweep corresponding to the full set of beams at a first time interval,
    wherein the performing the reduced beam sweep occurs at one or more second time intervals that occur more frequently than the first time interval.

2. The method of claim 1,
    wherein the performing the reduced beam sweep comprises scanning a reduced set of beam angles corresponding to the reduced set of beams, and
    wherein the full set of beams corresponds to a full set of beam angles available for transmitting and/or receiving by the antenna module.

3. The method of claim 1, wherein the performing the full beam sweep is triggered by occurrence of a trigger event.

4. The method of claim 1,
    wherein the reduced beam sweep is performed within a coherence time interval in which the beam that is selected is valid that occurs after a previous reduced beam sweep or a full beam sweep.

5. The method of claim 4, wherein the reduced beam sweep is performed once per the coherence time interval.

6. The method of claim 1, wherein the performing the reduced beam sweep corresponding to the reduced set of beams comprises:
    performing a sweep of two or more beams that neighbor an active beam currently used by the antenna module.

7. The method of claim 1, further comprising:
    distributing portions of the reduced beam sweep according to a pattern across a data transmission by interleaving the portions of the reduced beam sweep with portions of the data transmission.

8. The method of claim 1, further comprising:
    evaluating a first candidate beam of the reduced set of beams to determine a first signal characteristic and evaluating a second candidate beam of the reduced set of beams to determine a second signal characteristic,
    wherein the selecting the beam out of the reduced set of beams comprises:
        comparing the first signal characteristic of the first candidate beam with a second signal characteristic of the second candidate beam; and
        selecting the first candidate beam or the second candidate beam for transmitting and/or receiving from the antenna module based on the comparing the first signal characteristic with the second signal characteristic.

9. The method of claim 1, wherein the selecting the beam comprises selecting a first beam for a first transmitting and/or a first receiving, and wherein the performing the reduced beam sweep comprises performing a first reduced beam sweep, the method further comprising:
    performing a second reduced beam sweep for a second transmitting and/or a second receiving that occur after the first transmitting and/or the first receiving;
    selecting a second beam based on the second reduced beam sweep for the second transmitting and/or the second receiving;
    determining an angle difference between the first beam and the second beam; and
    performing a third reduced beam sweep for a third transmitting and/or a third receiving from the antenna module,
    wherein the third reduced beam sweep comprises scanning beam angles based on the angle difference that was determined.

10. The method of claim 1, wherein the performing the reduced beam sweep comprises:
    transmitting, by the antenna module, one or more of a reference signal, a sounding signal, a pilot signal, or a synchronization signal in at least one of the reduced set of beams; and
    receiving beam information based on the one or more of the reference signal, the sounding signal, the pilot signal, or the synchronization signal that was transmitted,
    wherein the selecting the beam out of the reduced set of beams comprises selecting the beam based on the beam information that was received, and
    wherein the beam information comprises information related to one or more signal characteristics associated with the one or more of the reference signal, the sounding signal, the pilot signal, or the synchronization signal that was transmitted.

11. The method of claim 10, wherein the beam information comprises one or more of received signal strength, signal to noise ratio, or signal to interference ratio of the one or more of the reference signal, the sounding signal the pilot signal, or the synchronization signal that was transmitted by the antenna module.

12. The method of claim 1, wherein the beam sweeping comprises a first antenna beam sweeping that is performed by a first antenna module comprising the antenna module, and wherein the selecting the beam comprises selecting a first beam, the method further comprising:
    performing a second antenna beam sweeping by a second antenna module, wherein the second antenna beam sweeping comprises selecting a second beam by the second antenna module independently of the first antenna beam sweeping performed by the first antenna module.

13. A wireless electronic device used in a wireless communication system, the wireless electronic device comprising:
    an antenna module configured to perform operations comprising:
        performing a reduced beam sweep corresponding to a reduced set of beams that are a subset of a full set of beams available for transmitting and/or receiving from the antenna module, without sweeping beams that are not members of the reduced set of beams;
        selecting a beam out of the reduced set of beams for transmitting and/or receiving from the antenna module based on the reduced beam sweep without sweeping beams that are not members of the reduced set of beams; and performing a full beam sweep corresponding to the full set of beams at a first time interval, wherein the performing the reduced beam sweep occurs at one or more second time intervals that occur more frequently than the first time interval.

14. The wireless electronic device of claim 13, wherein the performing the reduced beam sweep comprises scanning a reduced set of beam angles corresponding to the reduced set of beams, and wherein the full set of beams corresponds to a full set of beam angles available for transmitting and/or receiving by the antenna module.

15. The wireless electronic device of claim 13, wherein the antenna module is further configured to perform operations comprising:

performing a full beam sweep corresponding to the full set of beams at a first time interval, wherein the performing the reduced beam sweep occurs at one or more second time intervals that occur more frequently than the first time interval.

16. The wireless electronic device of claim 13, wherein the performing the reduced beam sweep corresponding to the reduced set of beams comprises:

performing a sweep of two or more beams that neighbor an active beam currently used by the antenna module.

17. The wireless electronic device of claim 13, wherein the antenna module is further configured to perform operations comprising:

evaluating a first candidate beam of the reduced set of beams to determine a first signal characteristic and evaluating a second candidate beam of the reduced set of beams to determine a second signal characteristic;

wherein the selecting the beam out of the reduced set of beams comprises:

comparing the first signal characteristic of the first candidate beam with a second signal characteristic of the second candidate beam; and selecting the first candidate beam or the second candidate beam for transmitting and/or receiving from the antenna module based on the comparing the first signal characteristic with the second signal characteristic.

18. The wireless electronic device of claim 13, wherein the selecting the beam comprises selecting a first beam for a first transmitting and/or a first receiving, and wherein the performing the reduced beam sweep comprises performing a first reduced beam sweep, wherein the antenna module is further configured to perform operations comprising:

performing a second reduced beam sweep for a second transmitting and/or a second receiving that occur after the first transmitting and/or the first receiving;

selecting a second beam based on the second reduced beam sweep for the second transmitting and/or the second receiving;

determining an angle difference between the first beam and the second beam; and performing a third reduced beam sweep for a third transmitting and/or a third receiving from the antenna module, wherein the third reduced beam sweep comprises scanning beam angles based on the angle difference that was determined.

19. The wireless electronic device of claim 13, wherein the performing the reduced beam sweep comprises:

transmitting, by the antenna module, one or more of a reference signal, a sounding signal, a pilot signal, or a synchronization signal in at least one of the reduced set of beams; and receiving beam information based on the one or more of the reference signal, the sounding signal, the pilot signal, or the synchronization signal that was transmitted, wherein the selecting the beam out of the reduced set of beams comprises selecting the beam based on the beam information that was received, and wherein the beam information comprises information related to one or more signal characteristics associated with the one or more of the reference signal, the sounding signal, the pilot signal, or the synchronization signal that was transmitted.

* * * * *